United States Patent [19]

Nose

[11] Patent Number: 4,750,164
[45] Date of Patent: Jun. 7, 1988

[54] OPTICAL SYSTEM DRIVING DEVICE

[75] Inventor: Hiroyasu Nose, Zama, Japan

[73] Assignee: Canon Kabushiki Kaisha, Tokyo, Japan

[21] Appl. No.: 937,497

[22] Filed: Dec. 3, 1986

[30] Foreign Application Priority Data

Dec. 9, 1985 [JP] Japan .................. 60-275180
Jul. 29, 1986 [JP] Japan .................. 61-176762
Aug. 21, 1986 [JP] Japan .................. 61-193997

[51] Int. Cl.$^4$ .................. G11B 7/08; G02B 26/10
[52] U.S. Cl. .................. 369/256; 350/255; 350/252; 369/45
[58] Field of Search .................. 369/45, 44, 46, 256; 350/247, 255, 252

[56] References Cited

U.S. PATENT DOCUMENTS

| | | | |
|---|---|---|---|
| 4,449,213 | 5/1984 | Noborimoto et al. | 369/45 |
| 4,475,179 | 10/1984 | Geyer | 369/45 |
| 4,511,212 | 4/1985 | Tanaka | 350/255 |
| 4,557,564 | 12/1985 | Van Sosmalen | 350/255 |
| 4,646,283 | 2/1987 | Ito et al. | 369/45 |
| 4,660,190 | 4/1987 | Fujii et al. | 369/45 |
| 4,669,823 | 6/1987 | Iguma et al. | 369/45 |

Primary Examiner—Steven L. Stephan
Attorney, Agent, or Firm—Fitzpatrick, Cella, Harper and Scinto

[57] ABSTRACT

In an optical system driving device, a support structure supporting an optical system holding member for movement relative to a base member is constituted by a plurality of bar-like support members of flexural resiliency each having one end thereof secured to the base member and the other end secured to the optical system holding member, each of the support members being disposed in a plane substantially perpendicular to a predetermined direction, at least two sets of such support members being juxtaposed in the predetermined direction with two such support members disposed so as to intersect each other between the opposite ends thereof as viewed from the predetermined direction being assumed to form a set.

10 Claims, 5 Drawing Sheets

OPTICAL SYSTEM DRIVING DEVICE

BACKGROUND OF THE INVENTION

1. Field of the Invention

This invention relates to an optical system driving device for two-dimensionally driving an optical system. Such an optical system driving device is suitably used to drive, for example, the objective of an optical information recording-reproducing apparatus for effecting recording and reproduction of information on a recording medium by the use of optical means.

2. Related Background Art

In an optical information recording-reproducing apparatus, a laser light is converged by an objective to form a minute spot on an information track and the information track is scanned by the spot. To carry out recording and reproduction accurately, it is necessary to cause the minute spot to accurately follow the information track always in its sufficiently focused state. So, in the optical information recording-reproducing apparatus, the focusing state with respect to the recording medium and the tracking state relative to the information track are always detected and when these are likely to deviate from a proper range, the objective is moved, whereby control for maintaining a proper focusing state and tracking state is accomplished. Such focusing control and tracking control are accomplished by supporting the objective two-dimensionally movably, securing a coil for focusing control and a coil for tracking control directly or indirectly to the objective, further placing the coils in suitable steady magnetic fields, respectively, and controlling the amounts of current supplied to the respective coils in conformity with the detection signals of the focusing state and the tracking state.

As the objective driving device in the optical information recording-reproducing apparatus as described above, use has heretofore been made of one comprising two sets of parallel plate springs connected in series so as to be orthogonal to each other, as proposed in U.S. Pat. No. 4,449,213. In such device, movement of the objective in the focusing direction is effected by the flexure of one set of parallel plate springs and movement of the objective in the tracking direction is effected by the flexure of the other set of parallel plate springs.

In such an objective driving device, however, for example, when one set of parallel plate springs is flexed for focusing control, a stress in the same direction is also produced in the other set of parallel plate springs, and this has led to the fault that unnecessary resonance is produced to make accurate control difficult. There has also been the fault that the structure is complicated and cost of assembly is high.

To eliminate the above-noted drawbacks peculiar to the objective driving device using the parallel plate springs, an objective driving device has recently been proposed in which the objective is supported by the use of four parallel metal wires (PCT application 8404841). FIG. 1 of the accompanying drawings is a perspective view schematically showing the construction of an objective driving device of this type. In FIG. 1, reference numeral 52 designates an objective having an optic axis in Z direction, and reference numeral 54 denotes a holding member for the objective. Reference numeral 56 designates a fixing member for supporting and fixing a movable portion including the objective. Reference numeral 58 denotes support members comprising four metal wires of the same property each having one end thereof secured to the holding member 54 and the other end secured to the fixing member 56. The support members 58 comprising these four metal wires are parallel to one another and disposed so as to define the four edges of a rectangular parallelopiped. The support members comprising these metal wires have moderate flexural resiliency. Thus, in this objective driving device, the holding member 54 is reciprocally movable over a suitable range in Z direction (focusing direction) and X direction (tracking direction).

However, in the objective driving device as shown in FIG. 1, the rigidity to the torsion about Y direction is low, and this has led to the problem that for example, where the center of gravity of the movable portion and the action point at which a drive force acts on the movable portion during the focusing control drive or during the tracking control drive do not coincide with each other with respect to Z direction and Y direction, torsional vibration 60 abput the Y-axis is liable to occur.

FIGS. 2 and 3 of the accompanying drawings are schematic views for illustrating the occurrence of such torsional vibration. That is, assuming that for example, in FIG. 2, a force 62 in X direction acts on the tip ends of metal wires 58 (i.e., the ends of the metal wires which are secured to the objective holding member 54), all the metal wires 58 are readily bent in that direction. Accordingly, when as shown in FIG. 3, oppositely directed forces act on the ends of the two pairs of metal wires 58, the respective pairs of metal wires 58 are readily bent in the directions of arrows 64 and 66, respectively, and thus the objective holding member 54 which is a rigid member secured to the ends of the metal wires 58 is readily rotated in the direction of arrow 68 about Y direction. Due to the resilient energy stored as the flexure of the metal wires 58 based on such rotation, the objective holding member 54 begins to rotate in the direction opposite to the direction of arrow 68 and thereafter, this is repeated to provide torsional vibration.

A device similar to the objective driving device shown in FIG. 1 is disclosed in U.S. Pat. No. 4,557,564. In this device, four elongated support members are arranged so as to assume substantially a V-shape as viewed from the direction of the optic axis of an optical system when the optical system is supported by the support members.

Thus, in this device, the resilient deformation of the support members is utilized for only the movement of the optical system in the focusing direction and other means is utilized for the movement of the optical system in the tracking direction, and this has led to relatively complicated construction of the entire device.

Also, in the driving device of such an arrangement, if an attempt is made to utilize the resilient deformation of the support members also for the movement of the optical system in the tracking direction, it is difficult for the support members to be deformed because the positions at which the pairs of support members are secured to the fixing member are identical to each other, and this has led to a great drive force required for the movement of the optical system in the tracking direction.

SUMMARY OF THE INVENTION

It is an object of the present invention to solve the above-noted problems peculiar to the prior art and to provide an optical system driving device which is simple in construction and in which it is difficult for torsional vibration to occur and accurate driving is possible.

The above object of the present invention is achieved by constituting support means supporting an optical system holding member for movement relative to a base member by a plurality of bar-like support members of flexural resiliency each having one end thereof secured to the base member and the other end secured to the optical system holding member, each of the support members being disposed in a plane substantially perpendicular to a predetermined direction, at least two sets of such support members being juxtaposed in the predetermined direction with two such support members disposed so as to intersect each other between the opposite ends thereof as viewed from the predetermined direction being assumed to form a set.

DESCRIPTION OF THE PREFERRED EMBODIMENTS

Specific embodiments of the present invention will hereinafter be described with reference to the drawings.

Figure 1:
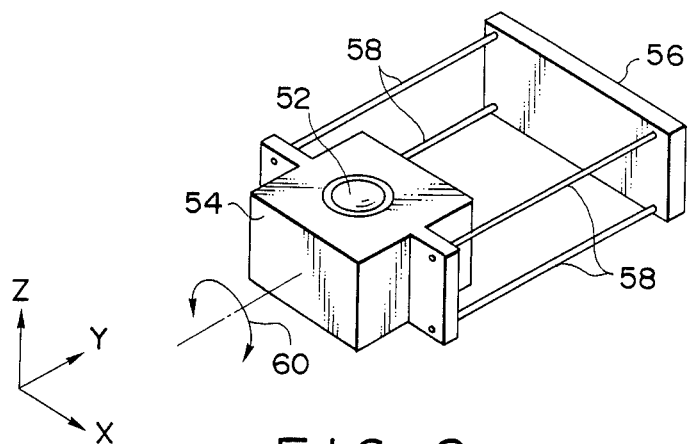
FIG. 1 is a perspective view showing an example of the construction of an optical system supporting portion in an optical system driving device according to the prior art.
Figure 2:
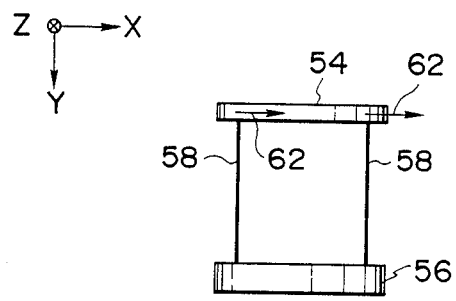
FIGS. 2 and 3 are schematic views illustrating the manner in which torsional vibration occurs in the device of FIG. 1.
Figure 3:
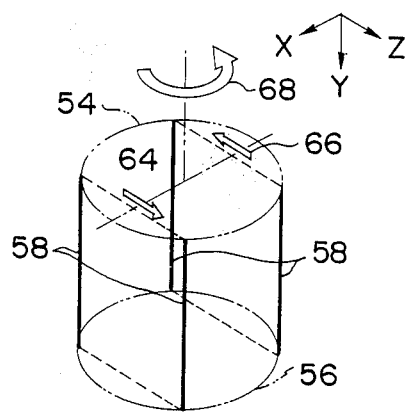
Figure 4:
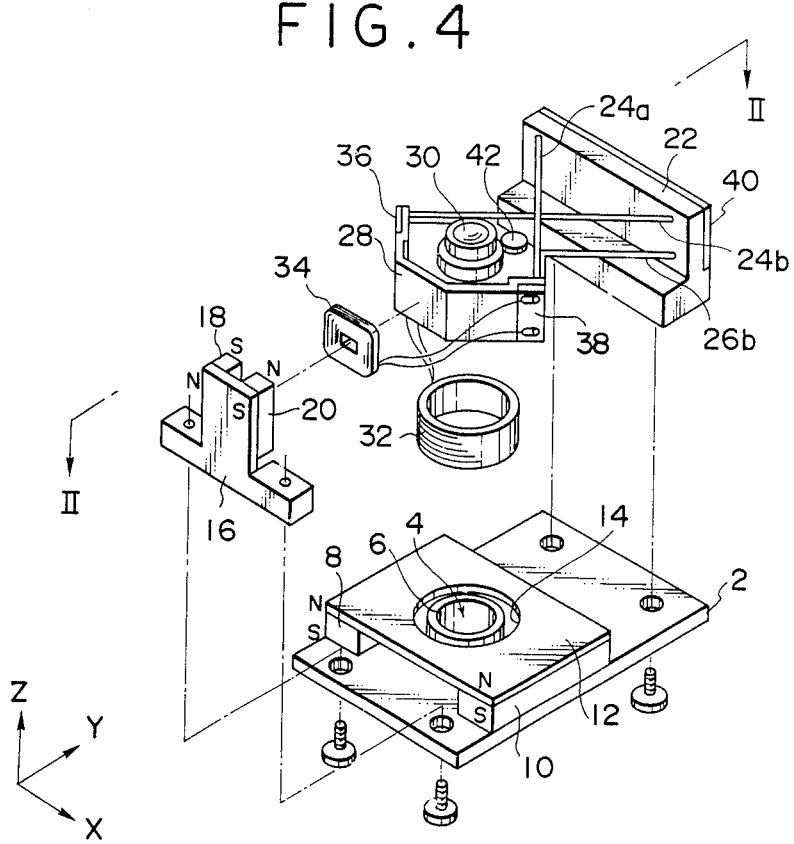
FIG. 4 is an exploded perspective view showing the construction of an embodiment of the optical system driving device of the present invention.
Figure 5:
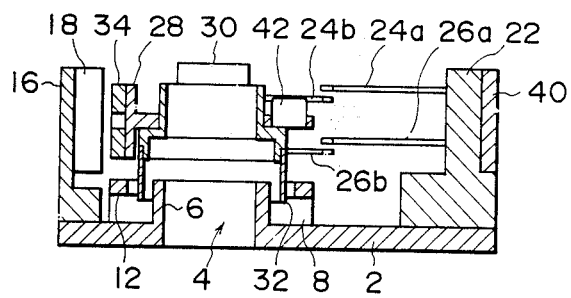
FIG. 5 is a cross-sectional view of the device of FIG. 4 taken along line II—II of FIG. 4.

FIG. 4 is an exploded perspective view showing an embodiment of an optical system driving device according to the present invention, and FIG. 5 is a cross-sectional view taken along line II—II of FIG. 4 and showing the optical system driving device in its assembled state. The present embodiment shows an example applied to the driving of the objective of an optical information recording-reproducing apparatus.

In FIGS. 4 and 5, reference numeral 2 designates a base plate fixed to the apparatus body side and formed of a ferromagnetic material such as electromagnetic soft iron. A through-hole 4 for securing a vertical optical path is formed substantially centrally of the base plate 2. An upwardly projecting cylindrical member 6 is secured to the base plate 2 around the through-hole 4. Two permanent magnets 8 and 10 are bonded onto the base plate 2 around the cylindrical member 6, and a planar member 12 is adhesively secured onto the two permanent magnets 8 and 10. A circular opening 14 somewhat larger than the configuration of the cylindrical member 6 is formed in that portion of the planar member 12 which corresponds to the cylindrical member 6. The cylindrical member 6 and the planar member 12 are formed of a ferromagnetic material similar to the base plate 2, and these both act as the yokes of a magnetic circuit provided by the permanent magnets 8 and 10.

An upright planar member 16 is fixed onto the base plate 2 by means of screws, and two permanent magnets 18 and 20 are adhesively secured to one surface of the upright planar member 16 so that they are vertical and parallel to each other with a predetermined spacing therebetween.

A fixing member 22 for fixedly supporting the objective is also fixed onto the base plate 2 by means of screws. One end of each of four similar wires 24a, 24b, 26a and 26b present in a plane parallel to a plane X-Y is secured to a side surface of the fixing member 22. The wires 24a, 24b, 26a and 26b are all insulatively coated with rubber, resin or like material. As shown, the wires 24a and 24b are disposed so as to intersect each other as viewed from Z direction and are present at slightly different positions with respect to Z direction (that is, they are vertically slightly spaced apart from each other). The wires 24a and 24b are similar to each other, and substantially identical to each other particularly in length and flexural resiliency. Also, the wires 24a and 24b intersect each other substantially at a right angle at the centers thereof as viewed from Z direction and are disposed symmetrically. The relation between the wires 26a and 26b is also similar to the relation between the wires 24a and 24b, and further the wires 26a and 26b have the same disposition as the wires 24a and 24b as viewed from Z direction.

An objective holding member 28 is secured to the other ends of the wires 24a, 24b, 26a and 26b and thus, these wires serve as an objective supporting member. An objective 30 having an optic axis in Z direction is fixedly held by the holding member 28, and this objective lies just above the through-hole 4 of the base plate 2. A cylindrical coil 32 for focusing control is secured to the lower portion of the objective holding member 28, and the lower end portion of this coil is positioned on the base plate 2 between the cylindrical member 6 and the circular opening 14 of the planar member 12. A flattened coil 34 for tracking control is secured to the Y direction end surface of the objective holding member 28, and this coil is positioned in opposed relationship with the permanent magnets 18 and 20. The two terminals of the coil 32 for focusing control are electrically connected to the wires 24b and 26b, respectively, through a terminal plate 36 attached to the objective holding member 28. Also, the two terminals of the coil 34 for tracking control are electrically connected to the wires 24a and 26a, respectively, through a terminal plate 38 attached to the objective holding member 28. A terminal plate 40 is also attached to the fixing member 22, and through this terminal plate, the output terminal of a focusing control drive circuit, not shown, is connected to the wires 24b and 26b, and the output terminal of a tracking control drive circuit, not shown, is connected to the wires 24a and 26a.

A balance weight 42 is attached to objective holding means 36 and is adjusted so that the center of gravity of the movable portion including this holding means coincides with the action point of the drive force during focusing and tracking controls.

Operation of the device of the present embodiment as described above will now be described.

In the magnetic circuit based on the permanent magnets 8 and 10, a horizontal magnetic field exists between the cylindrical member 6 and the opening 14 of the planar member 12 and a portion of the coil 32 for focusing control lies in the magnetic field and therefore, by supplying an electric power from the focusing control drive circuit to the coil 32 through the wires 24b and 26b, a vertical force is made to act on this coil due to the electromagnetic coaction with the above-mentioned magnetic field and thus, the objective holding member 28 is vertically moved by a desired distance, whereby focusing control is accomplished.

Figure 6A:
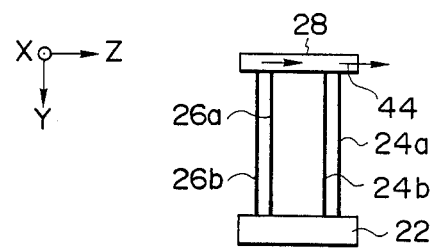
FIGS. 6A to 8 are schematic views illustrating the manner of deformation of support members in the device of FIG. 4 during driving.
Figure 6B:
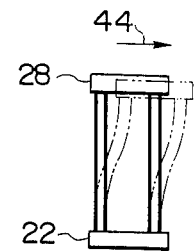

The conditions of the wires 24a, 24b, 26a and 26b during this focusing control are shown in FIGS. 6A and 6B. When a force in the direction of arrow 44 acts on the objective holding member 28 as shown in FIG. 6A, all the four wires exhibit similar bending as viewed from X direction as indicated by dotted lines in FIG. 6B because all these four wires are present in a plane parallel to the plane X-Y, and thus the objective holding member 28 is parallel-moved substantially in the direction of arrow 44 (that is, upwardly as viewed in FIG. 4).

On the other hand, as shown in FIG. 4, the permanent magnets 18 and 20 are disposed so that the directions of the polarities thereof are opposite to each other with respect to Y direction and also, these permanent magnets are disposed in opposed relationship with the two vertical portions of the winding of the coil 34 for tracking control and therefore, by supplying an electric power from the tracking control drive circuit to the coil 34 through the wires 24a and 26a, a force in X direction is made to act on this coil due to the electromagnetic coaction with a magnetic field produced in the two vertical portions of that winding by the permanent magnets 18 and 20 and thus, the objective holding member 28 is horizontally moved by a desired distance substantially in X direction, whereby tracking control is accomplished.

Figure 7A:
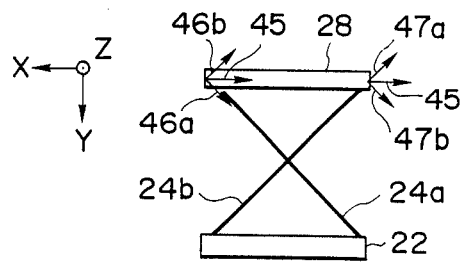
Figure 7B:
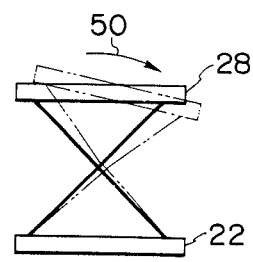

The conditions of the wires 24a, 24b, 26a and 26b during this tracking control are shown in FIGS. 7A and 7B. When a force in the direction of arrow 45 acts on the objective holding member 28 as shown in FIG. 7A, a compression component of force 46a and a bending component of force 46b act on the end of the wire 24a and a tensile component of force 47a and a bending component of force 47b act on the end of the wire 24b. Since the wires are not deformed for a tensile force and a compression force, the wires are rotated about the vicinity of the point of intersection in the direction of arrow 50 by the bending component of force as viewed from Z direction, as indicated by dotted lines in FIG. 7B. As viewed from Z direction, the wire 26a is present at the same position as the wire 24a and the wire 26b is present at the same position as the wire 24b, and these exhibit bending similar to that of the wires 24a and 24b and accordingly, the objective holding member 28 is rotated in the direction of arrow 50 only about Z direction.

In focusing and tracking controls, the objective holding member 28 strictly is not moved only in Z direction and X direction, but it can be regarded as being moved substantially in Z direction and X direction because the amount of movement of the objective holding member 28 in these controls is minute as compared with the length of the wires 24a, 24b, 26a and 26b, and no inconvenience occurs to focusing and tracking controls.

Figure 8:
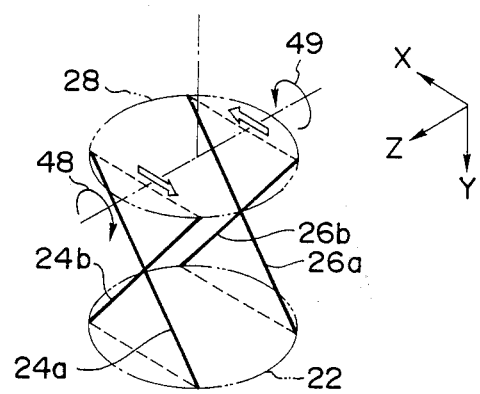

In the present embodiment, torsional vibration about Y direction hardly occurs. That is, when as shown in FIG. 8, oppositely directed forces in X direction are imparted to the pair of wires 24a and 24b and the pair of wires 26a and 26b in the attempt to cause torsional vibration about Y direction, the pair of wires 24a and 24b will be bent in the direction of arrow 48 about Z direction, while the pair of wires 26a and 26b will be bent in the direction of arrow 49 (i.e. the direction opposite to the direction of arrow 48) about Z direction. Actually, however, it is difficult for such bending of the wires to occur because these four wires are secured to the objective holding member 28 which is a rigid member. Accordingly, in the device of the present embodiment, the objective holding member 28 effects little or no torsional vibration about Y direction.

Figure 9:
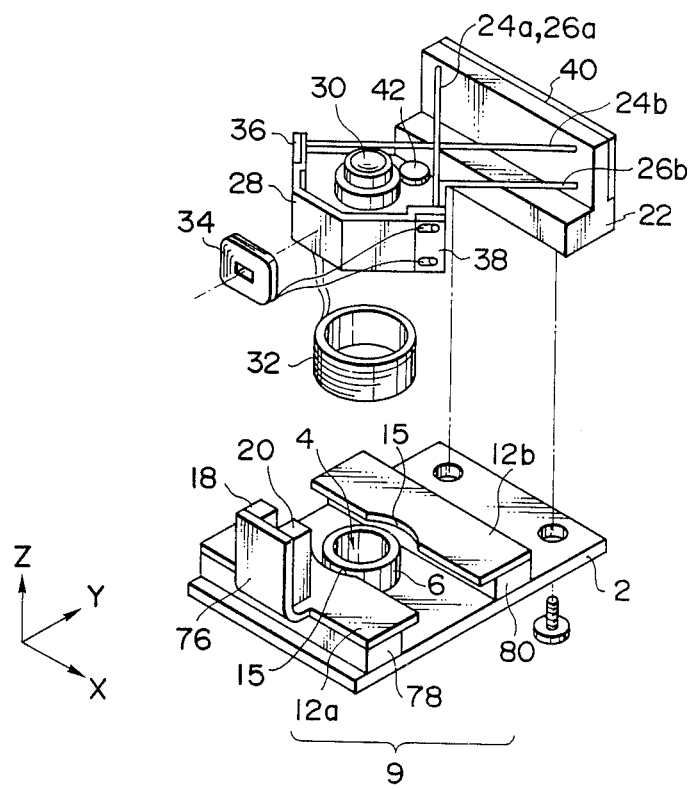
FIG. 9 is an exploded perspective view showing the construction of another embodiment of the optical system driving device of the present invention.

FIG. 9 is an exploded perspective view showing the construction of another embodiment of the optical system driving device of the present invention. In FIG. 9, members similar to those in FIG. 4 are given similar reference characters and need not be described in detail. The present embodiment differs from the embodiment of FIG. 4 in that permanent magnets 78 and 80 for focusing are disposed parallel to the tracking direction and that two plate-like members 12a and 12b serving as yokes are provided on the magnets 78 and 80, respectively, with a space extending in the tracking direction being provided therebetween. Permanent magnets 18 and 20 for tracking are secured to a bent portion 76 provided in a portion of the plate-like member 12a. An arcuate portion 15 somewhat larger than the configuration of the cylindrical member 6 is formed in that portion of each plate-like member which corresponds to the cylindrical member 6.

The present embodiment further overcomes the problem of "crosstalk" in the embodiment of FIG. 4, by the above-described construction. That is, in the device of FIG. 4, the magnetic flux crossing the focusing coil 32 has a component which is not completely perpendicular to the direction of the current but is inclined with respect thereto. In addition, the magnetic flux density differs between the vicinity of the member 6 and the vicinity of the member 12. Accordingly, when the holding member 28 is moved by tracking control, the electromagnetic force in the tracking direction received by the focusing coil 32 will be unbalanced by the inclination of the aforementioned magnetic flux and an unnecessary drive force will be applied to the holding member 28. That is, so-called "crosstalk" in which the focusing drive also affects the tracking drive will be caused. In contrast, in the present embodiment, the yokes are constituted by the two plate-like members 12a and 12b extending in the tracking direction and therefore, the magnetic flux density crossing the focusing coil 32 is uniform in the tracking direction and the "crosstalk" as described above is not caused.

Figure 10:
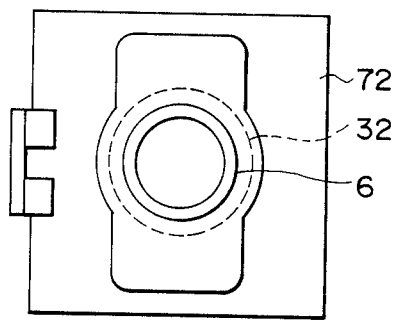
FIG. 10 is a plan view showing a modification of the yoke portion in the device of FIG. 9.

In the present embodiment, a similar effect may be obtained by greatly cutting out that portion in the tracking direction of a plate-like member 72 as shown in FIG. 10, instead of the plate-like members 12a and 12b, which is around the coil 32, and constituting a yoke by the single plate. If this is done, assembly of the magnetic circuit can also be accomplished easily. Alternatively, a cut-away may be provided in the cylindrical member 6.

Figure 11:
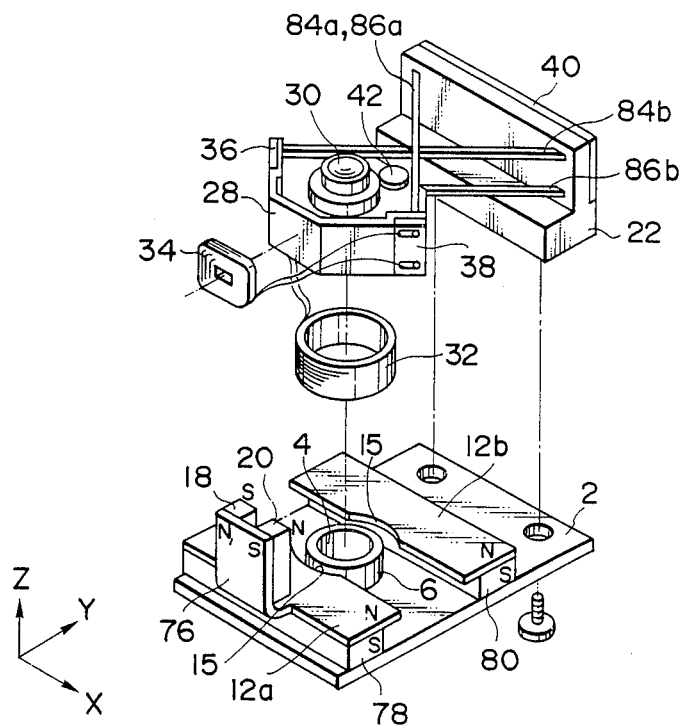
FIG. 11 is an exploded perspective view showing the construction of still another embodiment of the optical system driving device of the present invention.
Figure 12A:
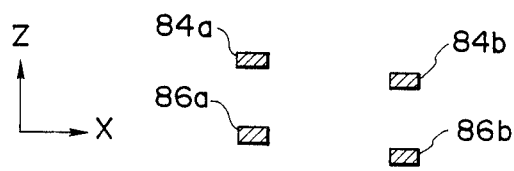
FIG. 12A shows a cross-sectional shape of the support members in the device of FIG. 11.

FIG. 11 is an exploded perspective view showing the construction of still another embodiment of the optical system driving device of the present invention. In FIG. 11, members similar to those in FIG. 9 are given similar reference characters and need not be described in detail. The present embodiment differs from the embodiment of FIG. 9 in that the cross-sectional shape of wires 84a, 84b, 86a and 86b supporting the holding member 28 is rectangular as shown in FIG. 12A. By adopting such a construction, the cross-sectional secondary moment of the wires for the focusing direction and the tracking direction is changed and the flexural rigidity in each direction can be chosen freely.

Figure 12B:
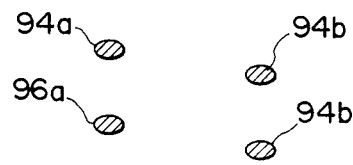
FIG. 12B is a schematic cross-sectional view showing a modification of the support members in the device of FIG. 11.

In the present embodiment, other bar-like resilient members having anisotropy in their flexural rigidity may be employed instead of the wires. For example, an effect similar to that of the above-described embodiment will be obtained even if wires of elliptical cross-sectional shape such as the wires 94a, 94b, 96a and 96b of FIG. 12B are employed. Also, even in yet still another embodiment wherein wires made to have anisotropy in the longitudinal direction and the lateral direction by fiber-reinforced plastics or the like are employed as the material of the wires, the flexural rigidity of the wires in the focusing direction and the tracking direction can be changed.

Again in the embodiments of FIGS. 9 and 11, driving is effected just in the same manner as that described in relation to the device shown in FIG. 4.

The present invention permits other various applications thereof in addition to the above-described embodiments. For example, in the above-described embodiments, the angle of intersection between the pairs of wires is substantially a right angle, whereby both of the rigidity for distorsion and the efficiency of two-dimensional driving can be maintained especially good. In the present invention, however, the angle of intersection between the pairs of wires is not specifically limited, but may be suitably set. Also, in the above-described embodiments, the position of intersection between the wires is substantially the center of the wires, whereby both of the rigidity for distorsion and the efficiency of two-dimensional driving can be very well maintained. In the present invention, however, the position of intersection between the wires is not specifically limited, but may incline toward the objective holding member side or the fixing member side if somewhat inside from the opposite ends of each wire.

In the present invention, the optical system to be driven is not restricted to the objective but the entire optical head including a light source, etc. may be driven. Also, the device of the present invention is applicable not only to the aforedescribed optical information recording-reproducing apparatus, but also to other various apparatuses such as distance measuring apparatuses, body shape detecting apparatuses and laser machining apparatuses. The present invention covers all these applications.

I claim:

1. An optical system driving device comprising:
   a base member;
   an optical system holding member holding an optical system having an optical axis;
   a plurality of bar-like support members each having one end thereof secured to said base member and the other end secured to said optical system holding member and having flexural resiliency, each of said support members lying in a plane substantially perpendicular to a predetermined direction, at least two sets of such support members being juxtaposed in said predetermined direction with two such support members disposed so as to intersect each other between the opposite ends thereof as viewed from said predetermined direction being assumed to form a set; and
   drive means for moving said optical system holding member relative to said base member in said predetermined direction and a direction substantially perpendicular thereto.

2. An optical system driving device according to claim 1, wherein said predetermined direction is parallel to the optical axis of said optical system.

3. An optical system driving device according to claim 1, wherein said bar-like support members have anisotropy in their flexural rigidity.

4. An optical system driving device according to claim 3, wherein the cross-sectional shape of said bar-like support members in a plane perpendicular to the lengthwise direction thereof is rectangular.

5. An optical system driving device according to claim 3, wherein the cross-sectional shape of said bar-like support members in a plane perpendicular to the lengthwise direction thereof is elliptical.

6. An optical system driving device according to claim 1, wherein said drive means comprises a plurality of coils secured to said optical system holding member, and magnetic field producing means secured to said base member for producing a magnetic field crossing said coils, at least two of said coils being such that the directions of current flowing therethrough are substantially orthogonal to each other at a portion whereat said magnetic field crosses said coils.

7. An optical system driving device according to claim 6, wherein said bar-like support members are electrically conductive and the currents flowing through said coils are supplied to said coils through said bar-like support members.

8. An optical system driving device according to claim 6, wherein at least one of said coils is of a cylindrical shape with said predetermined direction as its axis, and said means for producing a magnetic field crossing said coils comprises a permanent magnet and yokes provided on the outer and inner peripheries of said coils, the yokes provided on said outer periphery and said inner periphery being formed with a cut-away in a direction perpendicular to said predetermined direction.

9. An optical system driving device according to claim 1, wherein the angle of intersection between each set of said bar-like support members is substantially a right angle.

10. An optical system driving device according to claim 1, wherein each set of said bar-like support members intersect each other substantially at the central portions thereof.

* * * * *

UNITED STATES PATENT AND TRADEMARK OFFICE
CERTIFICATE OF CORRECTION

PATENT NO. : 4,750,164
DATED : June 7, 1988
INVENTOR(S) : Hiroyasu Nose

It is certified that error appears in the above-identified patent and that said Letters Patent is hereby corrected as shown below:

COLUMN 2

Line 6, change "parallelopiped." to --parallelepiped.--; and

Line 20, change "abput" to --about--.

COLUMN 7

Line 35, change "distorsion" to --distortion--; and

Line 42, change "distorsion" to --distortion--.

COLUMN 8

Line 61, change "intersect" to --intersects--.

Signed and Sealed this

Sixth Day of June, 1989

Attest:

DONALD J. QUIGG

Attesting Officer      Commissioner of Patents and Trademarks